United States Patent
Barger et al.

(10) Patent No.: US 7,126,877 B2
(45) Date of Patent: Oct. 24, 2006

(54) SYSTEM AND METHOD FOR DISAMBIGUATING SHOOTER LOCATIONS

(75) Inventors: James Edwin Barger, Winchester, MA (US); Stephen Douglas Milligan, Stow, MA (US); Marshall Seth Brinn, Newton, MA (US); Richard J. Mullen, Needham, MA (US)

(73) Assignee: BBN Technologies Corp., Cambridge, MA (US)

( * ) Notice: Subject to any disclaimer, the term of this patent is extended or adjusted under 35 U.S.C. 154(b) by 182 days.

(21) Appl. No.: 10/925,875

(22) Filed: Aug. 24, 2004

(65) Prior Publication Data

US 2006/0044943 A1    Mar. 2, 2006

(51) Int. Cl.
G01S 5/18    (2006.01)
G01S 3/80    (2006.01)

(52) U.S. Cl. .................. 367/127; 367/124; 367/906

(58) Field of Classification Search ............. 367/124, 367/127, 129, 906
See application file for complete search history.

(56) References Cited

U.S. PATENT DOCUMENTS

| | | | |
|---|---|---|---|
| 5,241,518 A | | 8/1993 | McNelis et al. |
| 5,777,948 A | * | 7/1998 | Ferkinhoff et al. ........... 367/124 |
| 5,781,505 A | * | 7/1998 | Rowland .................... 367/127 |
| 5,912,862 A | * | 6/1999 | Gustavsen et al. .......... 367/129 |
| 5,930,202 A | | 7/1999 | Duckworth et al. |
| 6,178,141 B1 | | 1/2001 | Duckworth et al. |
| 6,198,694 B1 | * | 3/2001 | Kroling et al. ............. 367/127 |
| 6,487,516 B1 | * | 11/2002 | Amorai-Moriya ........... 367/127 |

OTHER PUBLICATIONS

Pecina, J.N.; Unmanned navigation with a novel laser and smart software, Aerospace Conference, 2003. Proceedings. 2003 IEEE, vol. 1, Mar. 8-15, 2003 pp. 1-312 vol. 1 Digital Object Identifier 10.1109/AERO.2003.1235061.*
Information Processing in Sensor Networks, 2005. IPSN. Fourth International Symposium on Publication Date: Apr. 15, 2005, On pp. 491-496 , ISBN: 0-7803-9201-9 INSPEC Accession No. 8613383 Digital Object Identifier: 10.1109/IPSN.2005.1440982.*
Pierce, Allan D., "Nonlinear Effects In Sound Propagation", Acoustics, *McGraw-Hill Book Company*, 1981, pp. 611-614.
Kalyanmoy DEB, Multi-Objective Optimization Using Evolutionary Algorithms, *John Wiley & Sons, Ltd.*, (2001), pp. 85-101.

* cited by examiner

*Primary Examiner*—Ian J. Lobo
(74) *Attorney, Agent, or Firm*—Fish & Neave IP Group Ropes & Gray LLP (57) ABSTRACT

Systems and methods for locating the shooter of supersonic projectiles based on shockwave-only measurements are described. Muzzle blast signals are neither sought nor required. The system uses at least five, preferably seven, acoustic sensors that are spaced apart at least 1 meter. The sensor signals are acquired with a time resolution in the order of microseconds and processed to find and disambiguate the shockwave arrival angle unit vector. Two different Time-Difference-Of-Arrival (TDOA) measurement techniques are described, with one technique using counters in each signal channel and the other technique using cross-correlation between signal channels. A genetic algorithm can be used to efficiently disambiguate the results.

14 Claims, 8 Drawing Sheets

SYSTEM AND METHOD FOR DISAMBIGUATING SHOOTER LOCATIONS

GOVERNMENT CONTRACT

The U.S. Government has a paid-up license in this invention and the right in limited circumstances to require the patent owner to license others on reasonable terms as provided for by the terms of Contract No. HR0011-04-C-0035 awarded by DARPA ATO.

BACKGROUND OF THE INVENTION

The present invention relates to law enforcement technologies and security, and more particularly to methods and systems for determining the origin and direction of travel of supersonic projectiles based on shockwave-only information.

Systems and methods are known that can determine the general direction and trajectory of supersonic projectiles, such as bullets and artillery shells by measuring parameters associated with the shockwave generated by a projectile. One such system, described in U.S. Pat. No. 5,241,518 includes at least three spaced-apart sensors, with each sensor incorporating three acoustic transducers arranged in a plane. The sensors generate signals in response to the shockwave which are related to the azimuth and elevation angle to the origin of the shockwave. Shock-wave-only measurements are unable to determine the distance between the sensor(s) and the origin of the shockwave. Distance information is typically obtained from the muzzle flash or muzzle blast.

The azimuth and elevation angle of a shooter with reference to the sensor location are typically determined by measuring Time-of-Arrival (TOA) information of the shockwave at each sensor. Each of the sensors encounters the shockwave at a different time and generates a signal in response to the shockwave pressure. The signals from the various sensors are processed, and a direction (azimuth and elevation) from the sensor(s) to the origin of the shockwave and hence the trajectory of the projectile can be determined.

Conventional systems employ microphones, which can be relatively closely spaced (e.g., 1 meter apart) or widely dispersed (e.g., mounted on a vehicle or carried by soldiers on a battlefield), and measure shockwave pressure omni-directionally at their respective locations. However, unless the sensors are relatively widely spaced and/or the trajectory lies within the antenna, the timing precision needed to obtain accurate shockwave-only solutions very high, and special techniques are required.

A large antenna size can be a major disadvantage, for example, in vehicle-mounted systems. In addition, systems with an only marginal time resolution can generate ambiguous solutions in which the Time-of-Arrival information of the shockwave at a given set of sensors is nearly identical for two mirror-symmetric shooter locations.

It would therefore be desirable to provide a system and method that is able to determine the trajectory of a supersonic projectile with a smaller size antenna that occupies less space, and is also capable of eliminating the ambiguity in the determination of the shooter position.

SUMMARY OF THE INVENTION

The disclosed methods and systems are directed, inert alia, to force sensors for determining and disambiguating the origin and direction of travel of supersonic projectiles based on shockwave-only information.

According to one aspect of the invention, a method for disambiguating a projectile trajectory from shockwave-only signals includes the steps of measuring at least an initial portion of the shockwave-only signals at five or more spaced acoustic sensors forming an antenna, estimating a timing error distribution for the acoustic sensors, determining from the measured initial portion of the shockwave-only signals Time-Differences-Of-Arrival (TDOA) for sensor pairs with a time resolution that is greater than the estimated timing error distribution, and selecting the disambiguated projectile trajectory based a defined confidence level for disambiguation and on a value of a residual for the TDOA of the acoustic sensors.

According to another aspect of the invention, a method for disambiguating a projectile trajectory from shockwave-only signals includes the steps of measuring at least an initial portion of the shockwave-only signals at five or more spaced acoustic sensors forming an antenna, determining from the measured initial portion of the shockwave-only signals Time-Differences-Of-Arrival (TDOA) for sensor pairs, applying a genetic algorithm to an initial chromosome, that comprises projectile trajectory assumptions, for a predefined number of generations, computing residuals for solutions obtained with the chromosomes from the generic algorithm, performing a gradient search on a solution having a smallest residual and on its ambiguous alternate solution, and if a ratio of the solution having the smallest residual and its ambiguous alternate solution is greater than a predefined value, designating the solution having the smallest residual as the disambiguated projectile trajectory.

Embodiments of the invention may include one or more of the following features. The timing error distribution of the antenna and/or the acoustic sensors can be related to gain variations, sampling variations and sensor location variations of the antenna sensors. The confidence level for disambiguation depends on a size of the antenna, whereby smaller antennas require greater measurement accuracy. If two ambiguous solutions exist, the disambiguated projectile trajectory is selected based on a ratio of the residuals for two ambiguous solutions.

According to one advantageous embodiment, the Time-Differences-Of-Arrival (TDOA) for sensor pairs can be determined by designating a sensor that first encounters the shockwave as a reference sensor, and setting a first latch of a timing circuit when the amplitude of, for example, the initial portion of the shockwave-only signal at the reference sensor crosses a threshold value. The first latch activates start counters for each of the other sensors, with the counter in each of the other sensors running until the corresponding sensor encounters the shockwave. When one of the other sensors encounter the, for example, initial portion of the shockwave-only signal, it sets a second latch for that sensor that stops the start counter for that sensor. The TDOA values for the other sensors relative to the reference sensor are then recorded.

Alternatively, the Time-Difference-Of-Arrival (TDOA) for a sensor pair can be determined by performing a cross-correlation between shockwave signals detected at the sensor pairs and selecting the TDOA that produces the smallest residual.

To prevent spurious signals from being interpreted as shockwave waveforms, a projectile trajectory can be eliminated as being false if the acoustic energy of the measured shockwave waveform has less than a predetermined threshold value over a predetermined frequency band, for example, frequencies between approximately 700 Hz and 10 kHz. Alternatively or in addition, a projectile trajectory can be eliminated as being false if a time interval where a measured shockwave waveform has a positive value is less than a minimum time or greater than a maximum time, for example, less than approximately 70 μs or greater than approximately 300 μs.

Advantageously, the disambiguated projectile trajectory is selected so as to have a smaller value of the residual than any other computed projectile trajectory.

According to another advantageous embodiment, the ratio of the solution having the smallest residual and its ambiguous alternate solution is preferably greater than 2. This value, however, can depend on the closest point of approach of the projectile trajectory from the antenna.

The genetic algorithm can have chromosomes in the form of a 4-tuple, such as azimuth and elevation of the shooter and the missed shot, respectively, with crossover and mutation operators altering the population in a predefined manner.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed, inter alia, to a system and method for determining the direction, as defined by azimuth and elevation, of a shooter location and a trajectory of supersonic projectiles based on shockwave-only information.

Supersonic projectile trajectories are estimated solely from projectile shockwave arrival times measured by several closely spaced sensors distributed throughout a "small" measurement volume referred to as antenna. A measurement volume is considered small if the sensor spacing is 2 meters or less. Once the projectile's trajectory is identified, the location of the shooter is known except for distance back along the trajectory. This distance can be found if the antenna also obtains the arrival time of the muzzle blast sound. However, the muzzle blast is not always detectable, so that an accurate shockwave-only solution is essential for determining the trajectory.

Figure 1:
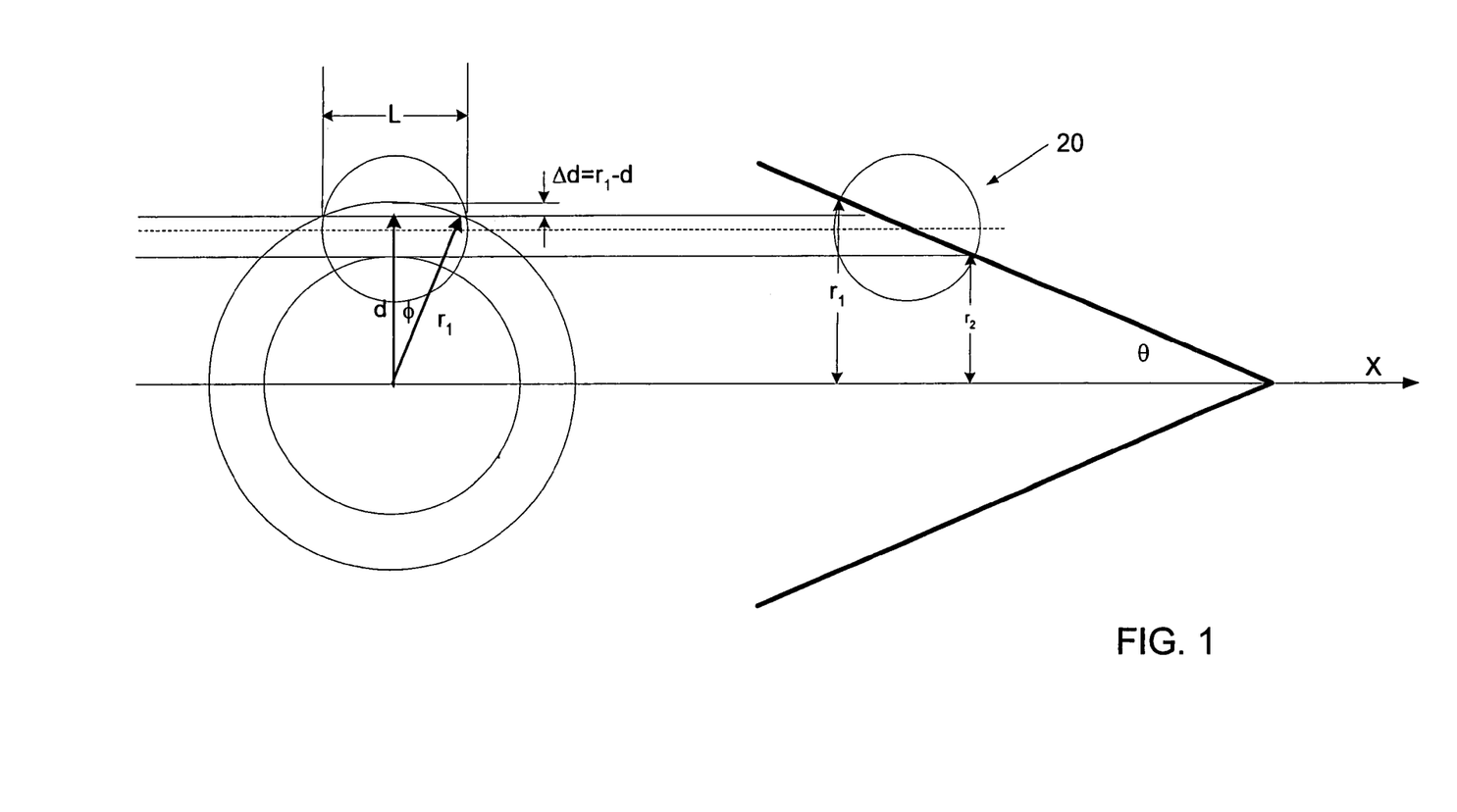
FIG. 1 shows schematically a cross-sectional view of a Mach cone intersecting with an antenna.

Referring now to FIG. 1, the shockwave surface is considered to be an expanding conical surface having its axis coincident with the bullet trajectory. The shockwave surface is also referred to as the Mach cone. To obtain the shockwave-only solution, three properties, the arrival angle, the radius of curvature, and the spatial gradient of the radius of curvature of the expanding conical surface are to be determined from arrival times measured at five or more antenna sensors.

The arrival angle of the conical surface-generator that first reaches the antenna determines two possible relative angles (often called 'ambiguous' angles) of the bullet trajectory relative to the arrival angle at the antenna. The 'ambiguous' angles will be described in more detail below with reference to FIG. 3. The radius of curvature of the conical surface at the antenna determines both distance and direction to the trajectory. The gradient of the radius of curvature along the path of the surface-generator determines which direction the bullet is moving, thereby removing the 'ambiguity' between the two possible directions. Determining these three shockwave properties accurately and correctly decide between the two possible 'ambiguous' trajectory angles requires very precise measurements. For example, random errors should be no greater than approximately 1 μs to decide correctly between the two alternative shooter aspect angles.

Figure 2:
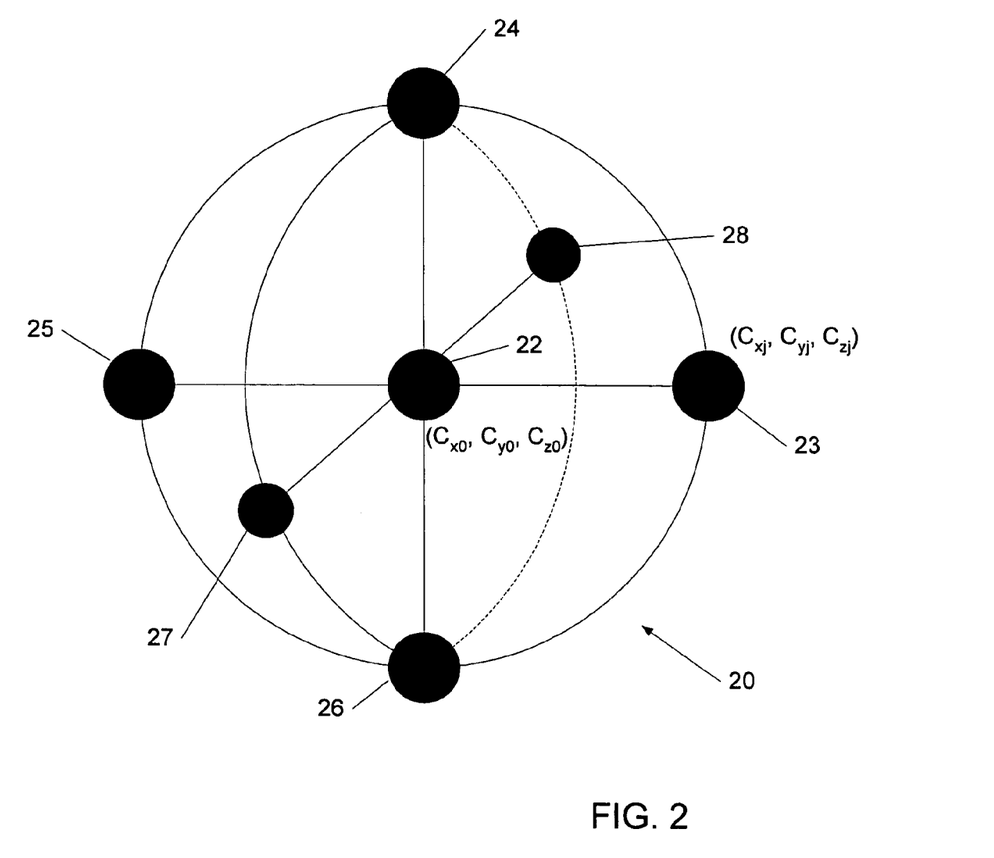
FIG. 2 shows schematically an exemplary sensor array with 7 omni-directional acoustic sensors.

The required accuracy can be estimated by considering the propagation characteristic of the shockwave depicted in FIG. 1. Referring now also to FIG. 2, an antenna 20 includes N sensors (N=7) able to determine the arrival times of an advancing conical shockwave. Since incoming bullet trajectories can essentially be expected to originate from anywhere, the antenna elements 23 to 28 can advantageously be uniformly distributed at locations C ($C_{xj}$, $C_{yj}$, $C_{zj}$) over a spherical surface, with one element 22 located in the center at ($Cx_0$, $Cy_0$, $Cz_0$), so that a uniform sensor aperture is presented independent of the arrival angle. The time instant that the first sensor, designated as the reference sensor, detects the advancing conical surface is denoted as $t_o$. The other sensors detect the advancing conical surface at subsequent times denoted as $t_i$. The sound propagation distances in the direction of the advancing conical surface are obtained by multiplying each of the time differences by the local speed of sound c, i.e., $d_i = c \cdot (t_i - t_o)$. If there are no measurement errors, then the conical surface passing though the reference sensor is also determined by the other (N−1) sensors, with the three-dimensional coordinates of the N points ideally determining all parameters of the shockwave cone. However, as mentioned above, errors in the arrival time measurements and sensor coordinates can result in erroneous parameters for the shockwave cone and hence also of the projectile's trajectory. In the following, the time-difference of arrival precisions needed to make correct decisions about the two otherwise ambiguous trajectory angles will be described.

The system advantageously incorporates features to ensure that it will not mistake non-ballistic signals, such as vehicle noise, vibration, wind-noise and EMI, for a shooter. For example, the sensor mast can be mounted to a vehicle (not shown) with elastomeric sleeves in mating joints to prevent rattling. The sensors can be attached to the ends of the spines with elastomeric couplings, having low-frequency resonances at about 1 Hz to isolate them from spine vibration. Sensor spines can be attached to a common hub that contains analog electronics, which can also be attached to the sensor mast with elastomeric shock mounts to isolate it from mast vibrations.

In addition, the following decision algorithm can be employed to filter out signals that lack the signatures typically found in shockwave-derived signals. All the values are parameterized, i.e., relative, and can be tuned externally. The listed values are provided only for illustration.

Figure 8:
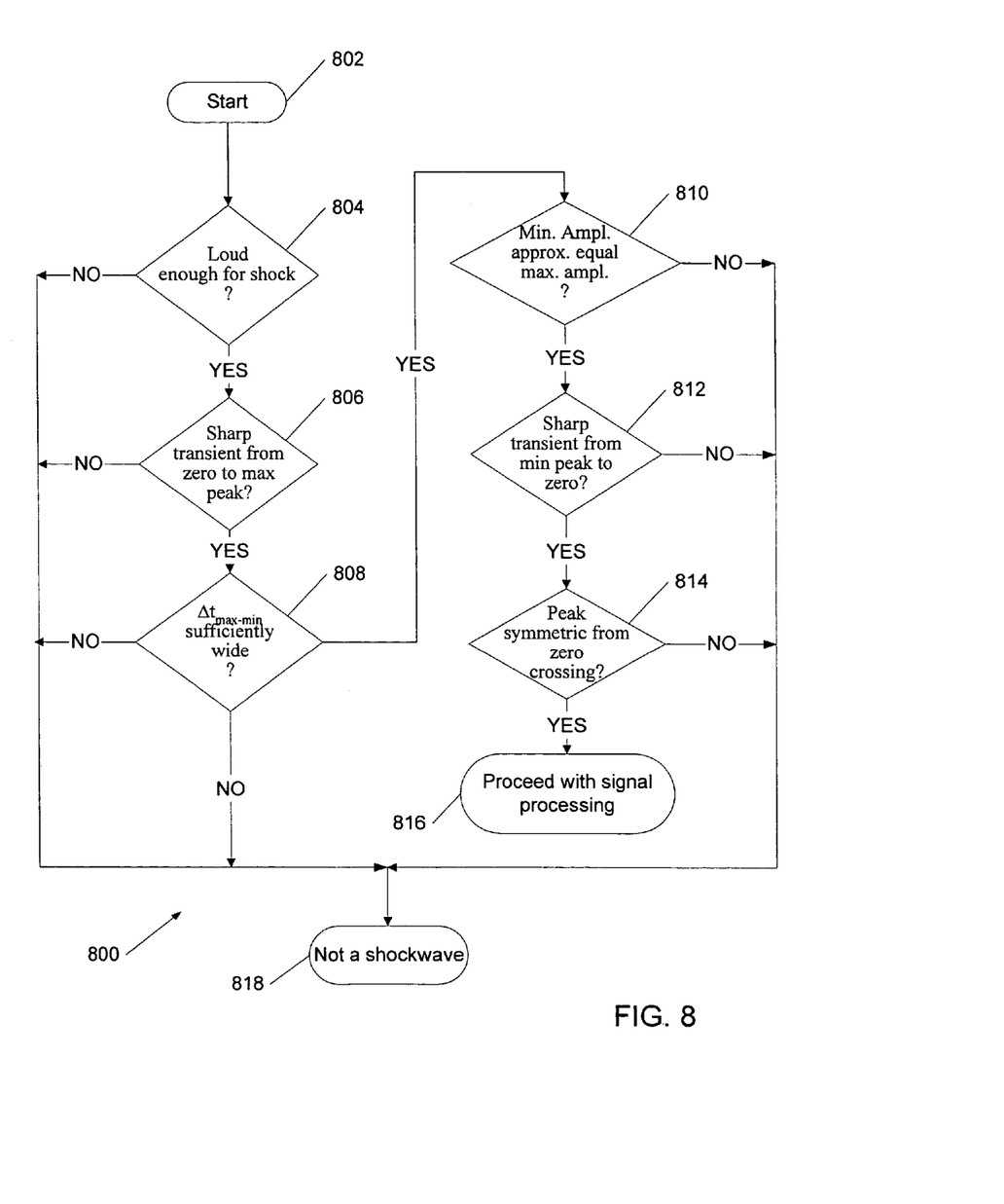
FIG. 8 is a process flow for discriminating against non-shockwave signals.

Referring now to FIG. 8, a process 800 determines if a detected signal originates from a shockwave. The process 800 starts at step 802 and checks in step 804 if the signal is a loud enough event to count as a shock, for example, does the peak signal value exceed a given parameterized threshold of, e.g., 500. If this is the case, the process 800 continues with step 806 and checks if there is a sharp transient from zero to the peak signal value, making sure that the transient to this peak value is not preceded by another signal having a significant magnitude, for example, 1/16 of the peak signal value.

If this is the case, the process 800 continues with step 808 and checks if the time between shockwave minima and maxima has a sufficiently large value, for example, 200–400 μs. If this is the case, the process 800 continues with step 810 and checks if the magnitudes of the minima and maxima peak signal amplitudes close, e.g. within 35% of one another. If this is the case, the process 800 continues with step 812 and checks if the pressure peak transient from the minimum peak signal to zero is sharp, using essentially the same criteria as in step 806. If this is the case, the process 800 continues with step 814 and checks if the times between the maximum signal value and the zero-crossing and between the zero-crossing and the minimum signal value are comparable, for example, within approximately 180 μs. If all steps produce an affirmative response, the process 800 decides that the signal can be a shockwave and the signal is processed, step 816. Conversely, if one of the 6 decision steps is answered in the negative, the detected signal does not originate from a shockwave, step 818.

Referring back to FIG. 1, the projectile trajectory is assumed to coincide with the x axis. The Mach angle is given by, $\theta = \arcsin(1/M)$, where M is the Mach number defined as the projectile velocity V divided by the sound velocity c. L refers to the characteristic length of the antenna. The radii of curvature of the cone at the two ends of the antenna 20 are $r_1$ and $r_2$. The end view in the left half of the picture shows how curvature $r_1$ is measured. Distance d is equal to $d = r_1 \cdot \cos(\phi)$. The angle $\phi$ is defined by $\sin(\phi) = L/2r_1$, so that for small angles $\phi$ one obtains $\phi \sim L/2r_1$. The time difference measure of curvature between the points on the antenna surface bisecting the conical surface with radius $r_1$ is equal to $dt_1 = \Delta d/c = (r_1 - d)/c \sim r_1 \phi^2/2c = L^2/(8 \cdot r_1 \cdot c)$. The time difference measure of curvature at $r_2 = r_1 - L \cdot \sin(\theta)$ is given by the same expression, with $r_2$ substituted for $r_1$. Accordingly, $dt_2 = dt_1 + L^3 \sin(\theta)/8r_1^2 c$.

Figure 4:
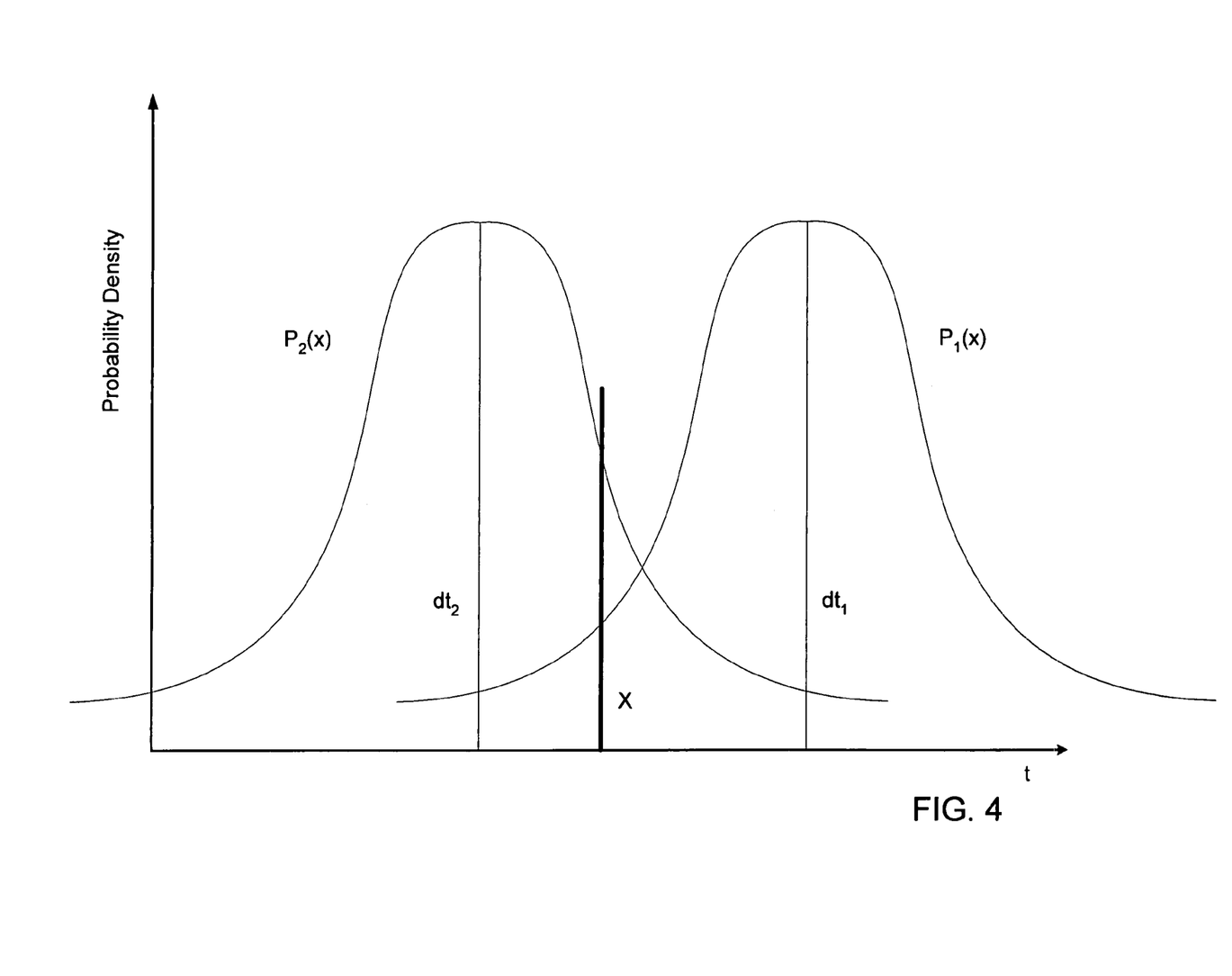
FIG. 4 shows schematically a probability density for time difference of arrival measurements for determining the curvature of the Mach cone.

Assuming unbiased measurement errors, i.e., assuming that the measurement time differences $dt_1$ and $dt_2$ are randomly distributed values having different means $dt_1$ and $dt_2$ but the same statistically determined standard deviation σ, the mean measurement values at the two ends of the array correctly determine the local curvature there. Exemplary distributions of measurement values for the time differences $dt_1$ and $dt_2$ are shown in FIG. 4.

The sample measurement made at end 2 is shown as X. The radius of curvature at end 2 (radius $r_2$) is smaller than at end 1 (radius $r_1$). Therefore, all measurements made at end one that have values larger than X will result in the correct decision that curvature at end 1 is greater than at end 2. The probability that the correct decision is made when the measurement at end 2 is equal to X is given by:

$$P(r_1 < r_2 | x) = p_2(x) \int_x^\infty p_1(\xi) d\xi \text{ with}$$

$$p_2(x) = \frac{1}{\sqrt{2\pi}\,\sigma} e^{-\frac{(x-dt_2)^2}{2\sigma^2}} \text{ and } p_1(\xi) = \frac{1}{\sqrt{2\pi}\,\sigma} e^{-\frac{(\xi-dt_1)^2}{2\sigma^2}}$$

Integration over x and making substitution of variables results in the following probability of making the correct decision:

$$P(r_1 < r_2) = \frac{1}{2} - \frac{1}{2\sqrt{\pi}} \int_{-\infty}^{\infty} e^{-u^2} \text{erf}(u-a) du \text{ with}$$

$$a = \frac{dt_1 - dt_2}{\sqrt{2}\,\sigma} = \frac{L^3 \sin(\theta)}{\sqrt{2}\,8r_1^2 c \sigma}$$

Figure 5:
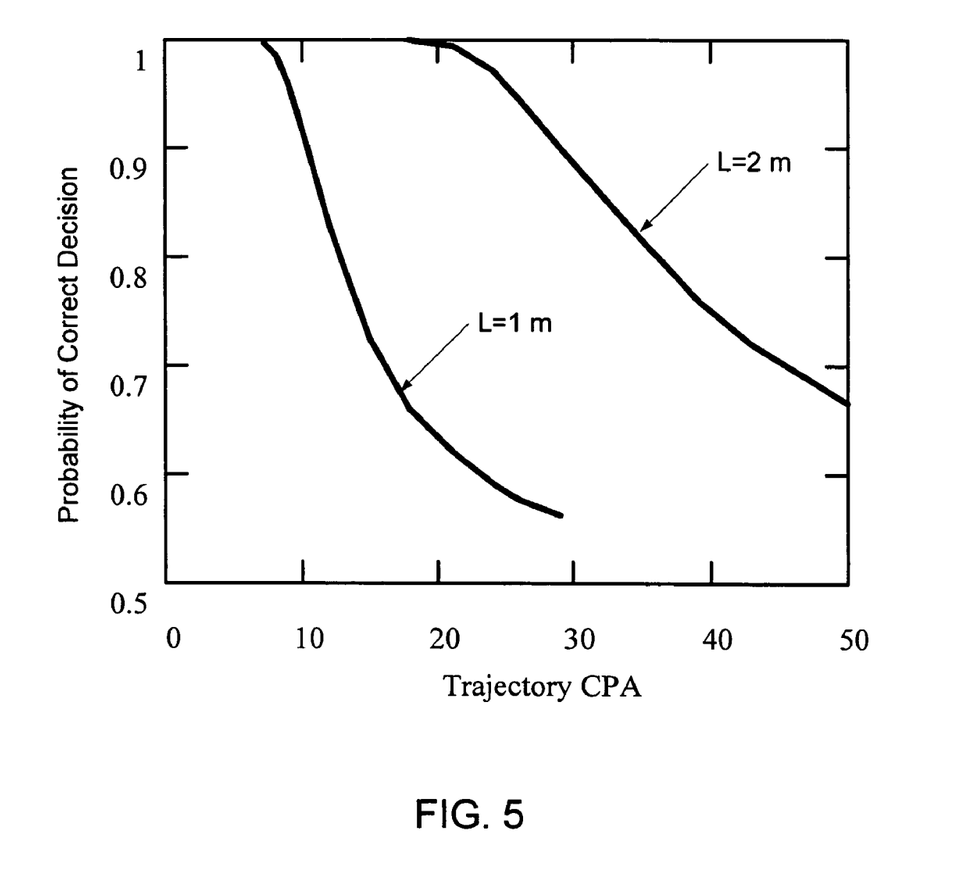
FIG. 5 shows schematically the probability of correctly disambiguating between shooter trajectories.

Referring now to FIG. 5, the probability of a correct decision, or confidence level for disambiguation, is plotted for two exemplary antenna sizes, L=1 m and L=2 m, against the closest point of approach (CPA) r between the projectile's trajectory and the antenna 20. The sound velocity is assumed to be c=340 m/s. It is evident that a larger antenna has significantly expanded range for unambiguous shockwave-only solutions. For large CPA values, the difference in curvature at the two ends of the antenna ($r_1$ and $r_2$) is too small to be distinguishable, so the probability for a correct decision approaches 50%, or complete ambiguity. Accordingly, the confidence level depends on the size, i.e. the diameter or spatial extent, of the antenna.

As mentioned above, errors arise from timing errors and sensor coordinate uncertainty. Sensor coordinate uncertainty contributes bias errors that are a highly variable function of shockwave arrival angle. However, for random arrival angles, sensor coordinate errors appear as random time difference errors.

Timing errors arise also both from gain and signal strength variations from channel to channel. Times of arrival are obtained when sensor outputs rise to a preset threshold value $V_0$. The timing error dt caused by a gain variation dg depends upon the time rate of voltage increase for the channel.

$$dt = \frac{dg}{g} \frac{V_0}{\frac{dV}{dt}}$$

Timing errors also occur when the signal strength varies over the aperture. For an aperture of length L and a cylindrical sound source at distance r, the maximum signal level variation across the aperture is equal to $p_0 (L/2r)$, where $p_0$ is the sound pressure at the aperture center. The timing error equation above applies also for this type of error, with the expression $$\frac{L}{2r}$$

replacing the relative gain variation $$\frac{dg}{g}.$$

The amplitude errors are not random among sensors, but vary uniformly from a maximum across the entire aperture to zero at the center. At ranges greater than 10 m, for a 1 m aperture, the maximum amplitude factor is less than 0.05, which is less than the channel gain variation parameter of 0.2, so that effects due to amplitude errors can be ignored. Conversely, as described above, at ranges less than about 10 m the Mach cone radius is small enough with respect to the aperture length of 1 m that measurement errors are not very important.

Realistic estimates for timing errors caused by sensor uncertainty with the assumption that the magnitudes of the error vectors are statistically independent and uniformly distributed between 0 and 1 mm, and that the error angles are statistically independent, the standard deviation of equivalent uniformly distributed random time difference errors will be equal to $$\frac{10^{-3}}{340 \cdot \sqrt{12}} = 0.85 \ \mu s.$$

The standard deviation of binomially distributed random time sampling errors for a system sampling at 1 MHz is equal to 0.25 μs. Timing errors due to gain variations are estimated to be approximately 0.75 μs for an exemplary system with a channel bandwidth of about 18 kHz, corresponding to a voltage rate of about 0.02 V/μs. The employed acoustic sensors for each array were chosen to have sensitivities within ±1,5 dB. Therefore, channel relative gain variations are approximately uniformly distributed between 0.84 and 1.19, so that the standard deviation of relative gain is approximately equal to $$\frac{1.19 - 0.84}{\sqrt{12}} = 0.10.$$

The threshold voltage is $V_0=0.15$ V, resulting in a standard deviation of timing errors of about 0.75 μs.

Total measurement timing errors are estimated by assuming that channel gain variations, sampling variations, and sensor location variations are all statistically independent. Then, the timing error standard deviation can be estimated as $\sqrt{0.85^2+0.75^2+0.25^2}=1.1$ μs.

It is difficult and expensive to achieve such precision with analog to digital conversion, because high sampling rates followed by interpolation are needed. Two different circuits for accurately measuring the Time-Difference-of-Arrival (TDOA) are employed in the disclosed system.

In one embodiment, the exemplary system uses an analog time difference of arrival (TDOA) circuit using 1 MHz clocks in each channel. The clocks are triggered when the sensor signal exceed a threshold signal level at the reference sensor, which was defined above as the sensor that first encounters the shockwave. As discussed above, a 1 MHz clock rate is sufficient to eliminate the importance of time-sample errors in practice. The system operates in an analog mode, relying on the detection of threshold levels, with the digital logic performing the following functions:

1. A first latch is set when the channel signal amplitude at the reference sensor that first encounters the shockwave crosses a threshold value.
2. The first latch sets start counters for each channel, which are incremented by one count at each clock cycle. The processor is alerted.
3. The counter in each channel runs until the corresponding sensor encounters the shockwave. This sets a second latch in the channel, which stops the count in that channel. If no second latch is set, the corresponding counter runs to an upper limit value.
4. The final number of counts in each counter is recorded in a digital TDOA register.
5. The processor reads the TDOA register.
6. The processor resets the counters for receiving the next shockwave.

In another embodiment, the correlation for each channel with every other channel is computed, for a time segment centered on the time of the hardware TDOA detection. The correlation of two functions, denoted Corr(g, h), is defined by $$Corr(g, h) \equiv \int_{-\infty}^{+\infty} g(\tau+t)h(\tau)d\tau$$

The correlation is a function of t, which is called a "lag." It therefore lies in the time domain, and has the following property:

$$Corr(g, h) \Leftrightarrow G(f)H(-f)$$

when g and h are real functions of the time. G(f) is the Fourier transform of g(t), and H(f) is the Fourier transform of h(t).

The total power in a signal is:

$$\text{Total Power} \equiv \int_{-\infty}^{+\infty} |h(\tau)|^2 d\tau = \int_{-\infty}^{+\infty} |H(f)|^2 df$$

The time-of-arrival signal has a finite length, so that the integration (or summation for discrete data) need only be performed over a finite time interval centered around the time-of-arrival; the length of the data in one or both channels can be extended by zero-padding so that the duration of the two signals matched, as is known in the art.

In the following discussion, integrals of continuous functions are used for simplicity, although the actual data are digitized and discrete values. Those skilled in the art will easily be able to replace the integrals by a summation.

Figure 6:
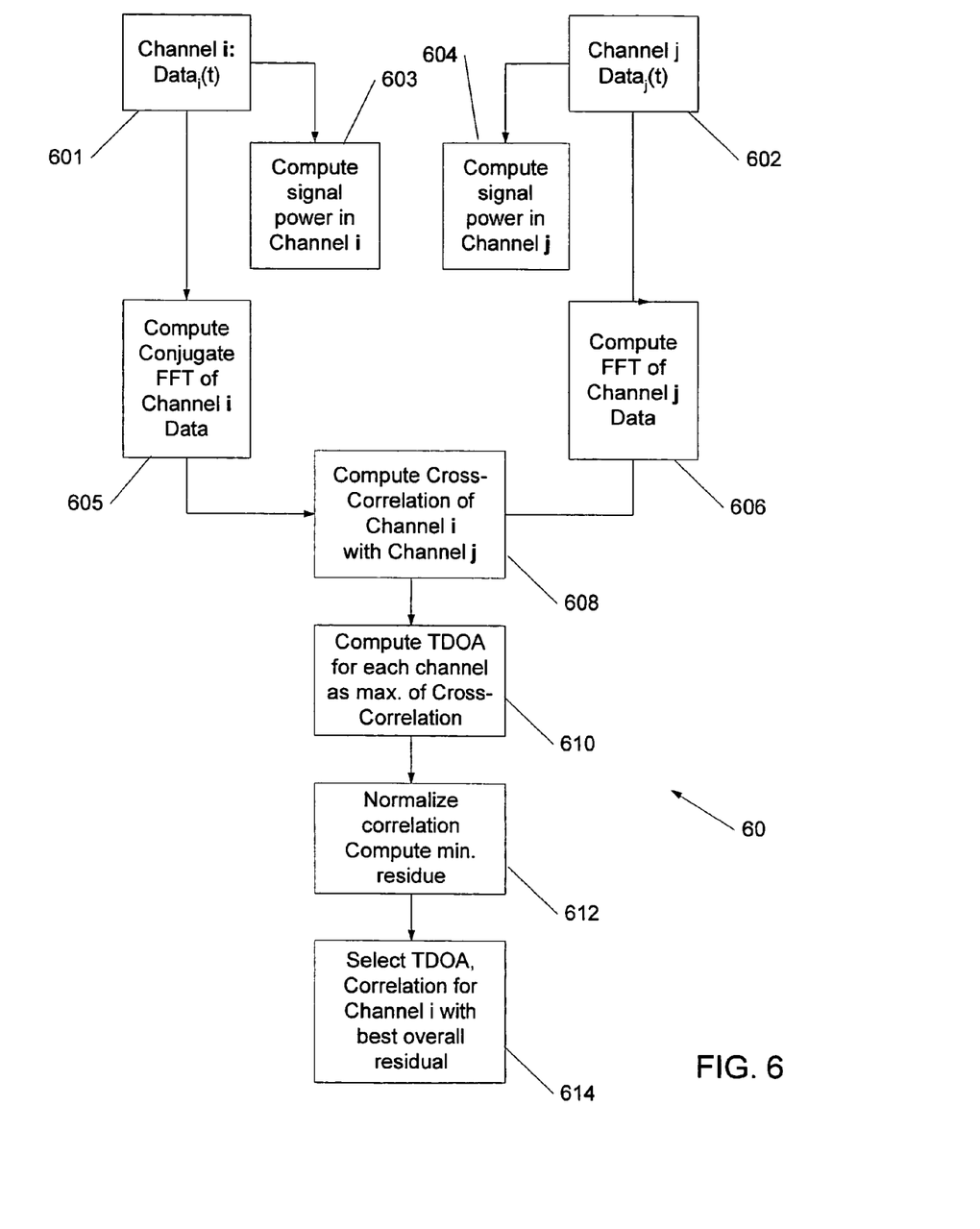
FIG. 6 shows a schematic diagram of a correlation process.

Referring now to FIG. 6, in a process 60 the shockwave signal time data $g_i(t)$, $g_j(t)$ are acquired in each channel i, j, steps 601, 602, and recorded as a function of time. In steps 603, 604, the total signal power in a channel i is computed for subsequent normalization of the correlation as $$\text{Total Power in channel } i \equiv \int_{\text{Signal duration}} |g_i(\tau)|^2 d\tau$$

The Fourier transform $G_i(f)$ of the shockwave signal time data $g_i(t)$ is computed for channel i and the conjugate $G_i(-f)$ is formed, step 605. Likewise, the Fourier transform $G_j(f)$ of the shockwave signal time data $g_j(t)$ is computed for all the other channels j, step 606. Thereafter, the cross-correlation $G_i(-f) \cdot G_j(f)$ is formed for each channel pair (i, j), step 608, which is a function $f_{i,j}(t)$ of the "lag" t. The TDOA for each channel pair is the time $t_{max}$ where f(t) has its maximum value, step 610. The correlation between the channels i and j can be defined as $$Corr(g_i, g_j) = \frac{\text{peak value } f_{i,j}(t)}{\sqrt{(\text{Power Channel } i) * (\text{Power Channel } j)}}$$

The residual for channel i is computed by computing the mean value for a sensor i over all sensors j:

$$\text{Residual}(i) = \text{mean}(\sum_{j \neq i} (1 - Corr(g_i, g_j)))$$

as indicated in step 612. The TDOAs and correlations for that channel with the best (i.e. smallest) overall residual are then selected as the "best" solution, step 614.

As mentioned above, the channel data are typically sampled at discrete time intervals with a predefined sampling rate of, for example, 41,666.66 samples/sec. This corresponds to a bin width of 24 μs, reflecting the time resolution for the received signal. The correlation processing is done with a time resolution that is improved by a factor of 8 to 3 μs by taking 333333 samples/sec.

Once the various time differences of arrival (TDOA) between the sensors have been determined from shockwave-only signals, the shooter azimuth and elevation and the bullet trajectory can be determined. The shooter position, i.e. the distance of the shooter from the sensor array can be determined if the muzzle blast signal is known in addition.

In a Cartesian coordinate system centered at the center of the array, i.e. $\{(C_{x0}, C_{y0}, C_{z0})=(0, 0, 0)\}$, the time of arrival TOA of the shockwave at a given sensor $(C_{xj}, C_{yj}, C_{yj})$ (see FIG. 2) is given by:

$$t_{Shock} = t_0 + \frac{L}{Mc}(\cos(\beta) + \sqrt{M^2 - 1} \sin(\beta))$$

with $$\cos(\beta) = \frac{V_x(X_0 - C_x) + V_y(X_0 - C_y) + V_z(X_0 - Cz)}{LMc}.$$

$$V = \begin{pmatrix} V_x \\ V_y \\ V_z \end{pmatrix}$$

represents the supersonic bullet velocity $Mc=V=\sqrt{V_x^2+V_y^2+V_z^2}$, with c being the speed of sound and M the Mach number. β represents the 'miss angle' between shooter position and bullet trajectory, which includes both azimuth and elevation angles. A direct hit would correspond to β=0. The Mach angle θ is defined by $$\frac{1}{M} = \sin(\Theta).$$

Figure 3:
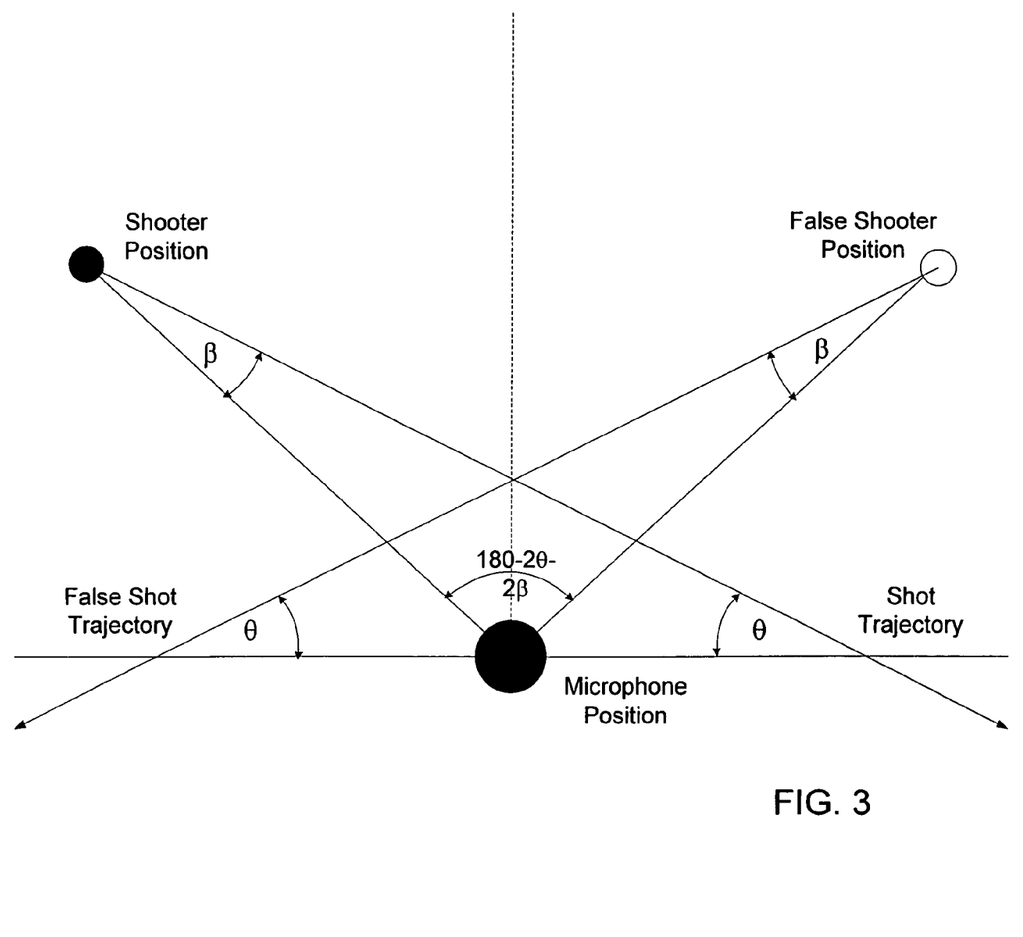
FIG. 3 shows schematically the ambiguity inherent in shockwave-only trajectory determination.

As mentioned above and indicated in FIG. 3, for a given shooter position and bullet trajectory, there is another shooter position and bullet trajectory for which the TOA of the shockwave at a given set of sensors is nearly identical. The two ambiguous solutions are in fact identical if in a simplified model, the shockwave is assumed to propagate across the sensor array as a plane wave. If the TDOA resolution is high enough to resolve the curvature of the shockwave, then the two nearly identical solutions can be disambiguated. The essential ambiguity of shockwave-only TDOA solutions is indicated in FIG. 3.

Assuming sufficiently accurate TOA measurements, the true solution for shooter position and bullet trajectory can be obtained by computing the shooter/trajectory combination that minimizes the root-mean-square (RMS) residual of measured and computed shockwave TDOA's:

$$\Delta \tau_{min} = \min \sqrt{\sum_j (\tau_{calc} - \tau_{meas})^2} ,$$

wherein the sum is taken over all sensors.

One approach for solving this problem is the L1 Levenberg-Marquardt algorithm described in detail in U.S. Pat. No. 5,930,202. Most classical point-by-point algorithms use a deterministic procedure for approaching the optimum solution, starting from a random guess solution and specifying a search direction based on a pre-specified transition rule, such as direct methods using an objective function and constraint values and gradient-based methods using first and second order derivatives. However, these methods have disadvantages, for example, that an optimal solution depends on the selected initial solution and that the algorithm may get "stuck" at a sub-optimal solution, such as a local minimum or where the cost function surface has a flat valley, so that further iterations will not improve the result.

It has been found that a global minimum of the shooter direction and the projectile trajectory can be computed more quickly and more reliably disambiguated by using an evolutionary genetic algorithm (GA). GAs mimic natural evolutionary principles and apply these to search and optimization procedures.

Figure 7:
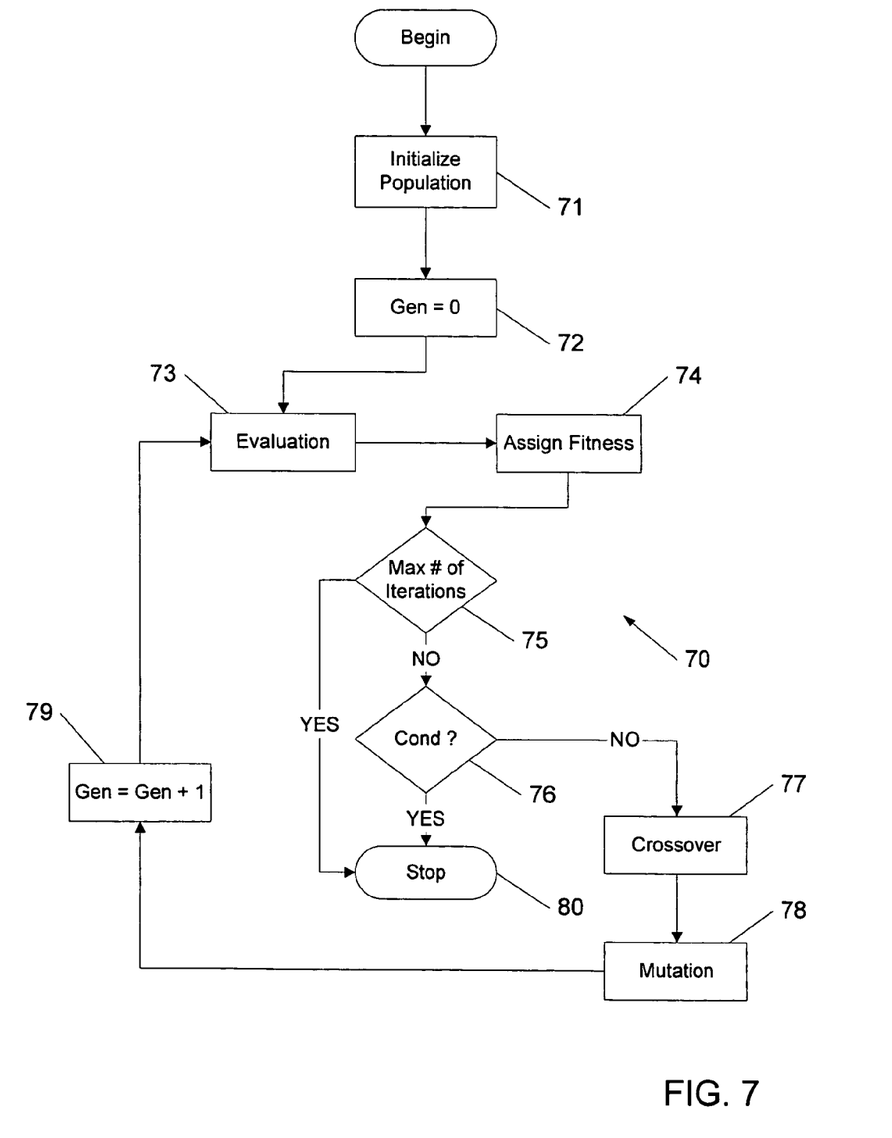
FIG. 7 is a process flow of a genetic algorithm used to correctly disambiguating between shooter trajectories.

A schematic flow diagram of a GA is shown in FIG. 7. Instead of starting with a single guess for a solution, a GA process 70 begins its search by initializing a random population of solutions, step 71, and sets a generation counter to zero indicating the initial solution set, step 72. Once a random population of solutions is created, each is evaluated in the context of the nonlinear programming problem, step 73, and a fitness (relative merit) is assigned to each solution, step 74. The fitness can be represented by the Euclidean distance $\Delta\tau_{min}$ between a calculated solution and the measured solution.

$$\Delta\tau_{min} = \min\sqrt{\sum_j (\tau_{calc} - \tau_{meas})^2}$$

Intuitively, an algorithm having a small value of $\Delta\tau_{min}$ is better.

For example, when applying the GA to disambiguate the solution for the shooter direction and projectile trajectory, the exemplary GA uses as a chromosome an initial population of 200 4-s, with each 4-containing the following values:

[Azimuth$_{Shooter}$, Elevation$_{Shooter}$, Azimuth$_{Missed}$, Elevation$_{Missed}$].

[Azimuth$_{Shooter}$, Elevation$_{Shooter}$] are defined by the angle $(\theta+\beta)$, while [Azimuth$_{Missed}$, Elevation$_{Missed}$] are defined by the angle $\beta$ (see FIG. 3). Since muzzle blast is not used with the aforedescribed shockwave-only approach, a nominal range between the sensor array and the shooter of 100 meter is assumed.

The initial population is created by random selection of the 4-s spanning a meaningful and reasonable range of values (all values are in degrees):

Azimuth$_{Shooter}$={0, . . . , 360},
Elevation$_{Shooter}$={−10, . . . , 30},
Azimuth$_{Missed}$={−20, . . . , 20}, and
Elevation$_{Missed}$={−20, . . . , 20}.

It is checked in step 75 if a maximum number of iterations for the GA, which can be set, for example, at 25, has been reached. If the maximum number of iterations has been reached, the process 70 stops at step 80, and the result can be either accepted or further evaluated. Otherwise, step 76 checks if preset fitness criteria have been satisfied.

Fitness criteria can be, for example, a computed missed azimuth of <15° and/or a ratio of the residuals of two ambiguous solutions. If the fitness criteria are satisfied, the process 70 stops at step 80; otherwise, a new population is created through crossover, step 77, and mutation, step 78, and the generation counter is incremented by one, step 79.

In each generation, the "best" individual is allowed to survive unmutated, whereas the top 100 individuals, as judged by their fitness, also survive, but are used to create the next 100 individuals from pairs of these survivors with the crossover/mutation operators listed in Table 1.

The following exemplary crossover and mutation operators were used to demonstrate the process 70:

TABLE 1

| Operator Name | Operator Type | Probability | Description |
| --- | --- | --- | --- |
| Azimuth-Crossover | Crossover | 0.5 | Exchange shooter/trajectory azimuth between two chromosomes |
| Missed-Crossover | Crossover | 0.5 | Exchange missed azimuth/elevation between two chromosomes |
| Field-Mutation | Mutation | 0.3 | Replace a given field (with a probability of 0.25 per field) with a randomly selected new value within range |

TABLE 1-continued

| Operator Name | Operator Type | Probability | Description |
| --- | --- | --- | --- |
| Incremental-Mutation | Mutation | 0.4 | Introduce small mutations in all fields of a chromosome (within ≦2° for shooter information; within ≦0.5° for missed information |
| Flip-Mutation | Mutation | 0.1 | Change the solution into the ambiguous alternate solution |
| No-Mutation | Mutation | 0.2 | Chromosome remains intact |

Disambiguation is achieved by performing a gradient search on the best solution and the corresponding alternate solution. For both ambiguous solutions, the residuals and the ratios of the residuals are computed. If the computed missed azimuth is <15', representing "close" shots and if the ratio of the residuals is >2, then the solution with the lower residual is selected. Otherwise, no actual selection is made, and the solution with the lower residual is labeled the "primary" solution, while the other solution is labeled an "alternate" solution.

The GA algorithm produced a solution on a 1 GHz computer running the Linux operating system in 0.15 seconds on a broad range of simulated shots. 97% of the simulated shots were within 15° of missed azimuth, and 86% of the simulated shots were within 5° of missed azimuth. Using the aforedescribed disambiguation algorithm, close shots, i.e. shots having a missed azimuth of <15°, were disambiguated 95% of the time. The disambiguation algorithm produced correct results for more distant shots 70% of the time. The accuracy of disambiguation is expected to vary based on the sensor array geometry and the presumed distribution of shots, with shots having a low elevation being easier to disambiguate.

In summary, the described system can accurately, quickly and often unambiguously provide shooter direction and bullet trajectory based on shockwave-only measurements. The system also obtains accurate shooter azimuth solutions when the muzzle blast waveform is detected. The system does not give false shooter indications in response to vehicle vibration and noise, nor wind noise, firecrackers or nearby shooting in directions away from the system.

It should be noted that the system detecting the shockwave signals performs two test on the initial waveforms for determining if the signal can indeed be attributed to shockwaves. First, the measured total energy in a frequency band between approximately 700 Hz and 10 kHz is compared with an empirical threshold value. Only if this threshold value is exceeded, can the signal form be considered as arising from a shockwave. Secondly, the time span of the detected initial positive pressure peak must be greater than approximately 70 μs and less than approximately 300 μs. These criteria provide immunity of the system from impulsive noise, such as firecrackers and non-threatening gunfire. If these tests are not passed, the detected waveform is not considered a shockwave, and no shooter solution is attempted.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for disambiguating a projectile trajectory from shockwave-only signals, comprising:
    measuring at least an initial portion of the shockwave-only signals at five or more spaced acoustic sensors forming an antenna;
    determining from the measured initial portion of the shockwave-only signals Time-Differences-Of-Arrival (TDOA) for sensor pairs;
    applying a genetic algorithm to an initial chromosome, that comprises projectile trajectory assumptions, for a predefined number of generations;
    computing residuals for solutions obtained with the chromosomes from the genetic algorithm;
    performing a gradient search on a solution having a smallest residual and on its ambiguous alternate solution; and
    if a ratio of the solution having the smallest residual and its ambiguous alternate solution is greater than a predefined value, designating the solution having the smallest computed residual as the disambiguated projectile trajectory.

2. The method of claim 1, wherein the predefined value of the ratio is approximately 2.

3. The method of claim 1, wherein the chromosome comprises a 4-tuple having elements selected from the group consisting of shooter azimuth, shooter elevation, missed azimuth and missed elevation.

4. The method of claim 1, wherein applying a genetic algorithm comprises applying crossover and mutation operators.

5. The method of claim 4, wherein the crossover operator comprises crossover azimuth and crossover missed azimuth operators.

6. The method of claim 5, wherein the crossover azimuth operator exchanges shooter and trajectory azimuth between two chromosomes.

7. The method of claim 5, wherein the crossover missed azimuth operator exchanges missed azimuth and missed elevation between two chromosomes.

8. The method of claim 4, wherein the mutation operator comprises field-mutation, incremental mutation, flip mutation, and no mutation.

9. The method of claim 8, wherein the field-mutation operator replaces a chromosome field with a randomly selected value.

10. The method of claim 8, wherein the incremental mutation operator induces small mutations in all fields of a chromosome.

11. The method of claim 10, wherein the small mutation operator comprises changes in all fields of a chromosome of less than ±2° in shooter azimuth and elevation, and less than ±0.5° for missed azimuth and elevation.

12. The method of claim 10, wherein the flip-mutation operator comprises changing the solution having a smallest residual into its ambiguous alternate solution.

13. The method of claim 10, wherein the flip-mutation operator comprises leaving a chromosome unaltered.

14. The method of claim 1, wherein determining a Time-Difference-Of-Arrival (TDOA) for a sensor pair comprises performing a cross-correlation between shockwave signals detected at the sensor pairs and selecting the TDOA that produces the smallest computed residual.

* * * * *